US011473302B2

(12) United States Patent
Hunsicker et al.

(10) Patent No.: US 11,473,302 B2
(45) Date of Patent: Oct. 18, 2022

(54) SEGMENTAL DUCT COUPLER DEVICES, SYSTEMS, AND METHODS

(71) Applicant: Structural Technologies IP, LLC, Columbia, MD (US)

(72) Inventors: Gregory A. Hunsicker, Dallas, TX (US); Zuming Xia, Fort Worth, TX (US); John R. Crigler, Woodbine, MD (US)

(73) Assignee: Structural Technologies IP, LLC, Columbia, MD (US)

( * ) Notice: Subject to any disclaimer, the term of this patent is extended or adjusted under 35 U.S.C. 154(b) by 876 days.

(21) Appl. No.: 15/598,417

(22) Filed: May 18, 2017

(65) Prior Publication Data

US 2017/0350126 A1 Dec. 7, 2017

Related U.S. Application Data

(63) Continuation of application No. PCT/US2015/061888, filed on Nov. 20, 2015.

(60) Provisional application No. 62/082,356, filed on Nov. 20, 2014.

(51) Int. Cl.
| | |
|---|---|
| *E04C 5/10* | (2006.01) |
| *F16L 13/02* | (2006.01) |
| *F16L 21/02* | (2006.01) |
| *F16L 23/18* | (2006.01) |
| *F16L 19/05* | (2006.01) |
| *F16L 25/00* | (2006.01) |

(52) U.S. Cl.
CPC .............. *E04C 5/10* (2013.01); *F16L 13/029* (2013.01); *F16L 21/022* (2013.01); *F16L 23/18* (2013.01); *F16L 19/05* (2013.01); *F16L 25/0018* (2013.01)

(58) Field of Classification Search
CPC ......... E04C 5/10; F16L 13/029; F16L 21/022; F16L 23/18
USPC ........................................................ 285/336
See application file for complete search history.

(56) References Cited

U.S. PATENT DOCUMENTS

| | | | |
|---|---|---|---|
| 4,176,274 A | 11/1979 | Lippera | |
| 4,779,901 A * | 10/1988 | Hailing | F16L 27/04 285/271 |
| 4,997,214 A | 3/1991 | Reese | |
| 5,076,617 A * | 12/1991 | Bronnert | F16L 23/18 285/368 |

(Continued)

FOREIGN PATENT DOCUMENTS

CN 103643631 A 3/2014

OTHER PUBLICATIONS

International Search Report with IPRP and Written Opinion for Application No. PCT/US2015/061888 dated May 23, 2017.

*Primary Examiner* — James M Hewitt, II
(74) *Attorney, Agent, or Firm* — Jenkins, Wilson, Taylor & Hunt, PA

(57) ABSTRACT

Segmental duct coupler devices, systems, and methods are provided herein. A duct coupler device can include a single, discrete body of material for welding to a duct segment. A system, including a duct segment having a duct coupler device welded thereto, is provided. The connection or points of connection between the duct coupler device and the duct segment in the system are devoid of internal and/or external seals. The duct coupler device and system can be cast in concrete. Multiple concrete segments can be assembled together to form a bridge, a roadway, a building, a slab, or any other structure.

23 Claims, 4 Drawing Sheets

(56) References Cited

U.S. PATENT DOCUMENTS

| | | | |
|---|---|---|---|
| 5,336,351 A | 8/1994 | Meyers | |
| 5,893,961 A | 4/1999 | Kime et al. | |
| 6,250,686 B1 | 6/2001 | Becker et al. | |
| 6,318,761 B1 | 11/2001 | Robertson | |
| 6,494,497 B1 | 12/2002 | Kertesz | |
| 6,764,105 B1 | 7/2004 | Sorkin | |
| 6,773,039 B2 * | 8/2004 | Muenster | F16L 37/138 |
| | | | 285/259 |
| 6,834,890 B2 | 12/2004 | Sorkin | |
| 6,955,013 B2 | 10/2005 | Thompson | |
| 6,983,960 B2 | 1/2006 | Svetlik | |
| 7,207,601 B2 | 4/2007 | Baharav | |
| 7,404,872 B2 | 7/2008 | Fisher | |
| 7,695,021 B1 * | 4/2010 | Sorkin | E04C 5/10 |
| | | | 285/226 |
| 7,980,602 B2 | 7/2011 | Charlson et al. | |
| 8,372,229 B2 | 2/2013 | Silagyi et al. | |
| 9,423,059 B1 * | 8/2016 | Sorkin | E04C 5/10 |
| 2003/0132630 A1 | 7/2003 | French | |
| 2006/0001259 A1 | 1/2006 | Carter, Jr. et al. | |
| 2007/0024055 A1 * | 2/2007 | Kraft | F16L 23/22 |
| | | | 285/364 |
| 2008/0005996 A1 | 1/2008 | Baur et al. | |
| 2010/0301596 A1 | 12/2010 | Amann et al. | |
| 2011/0101679 A1 | 5/2011 | Crigler et al. | |
| 2012/0298248 A1 * | 11/2012 | Schwager | F16L 9/06 |
| | | | 138/173 |
| 2014/0367961 A1 * | 12/2014 | Crigler | F16L 13/113 |
| | | | 285/230 |

\* cited by examiner

SEGMENTAL DUCT COUPLER DEVICES, SYSTEMS, AND METHODS

CROSS REFERENCE TO RELATED APPLICATIONS

This application is a continuation of and claims priority to PCT/US2015/061888 filed Nov. 20, 2015, which claims the benefit of and priority to U.S. Provisional Patent Application Ser. No. 62/082,356, filed Nov. 20, 2014, the disclosures of which are incorporated herein by reference in their entirety.

TECHNICAL FIELD

The subject matter disclosed herein relates generally to coupler devices, systems, and methods, and more particularly to segmental duct coupler devices, systems, and methods for concrete segments.

BACKGROUND

Structural systems and methods commonly utilize concrete segments that assemble together to form structural elements such as bridges and roadways. In constructing the concrete segments, concrete is poured around flexible internal members, for example, segmental ducts, which become set within the concrete. The segmental ducts and respective concrete segments can couple together end-to-end for forming a network of ducts, through which internal components (e.g., rods, strands, or bars) are inserted. The ducts provide environmental and/or mechanical protection for the internal components, for example, by protecting the internal components from corrosive elements (e.g., salt, grease, oil, de-icing chemicals, etc.) that accumulate on bridges and roadways.

Many approaches have tried to address problems of efficiently and inexpensively coupling concrete segments. Problems can arise where the segmental duct coupling components must be assembled on a job-site, as conventional approaches utilize multiple different parts to connect segmental ducts to couplers, which are separately manufactured, and which require manually performing multiple steps to assemble the parts together correctly. This is both time consuming and expensive in terms of manufacturing and labor costs.

Consequently, there remains a need for improved duct coupler devices, systems, and methods that overcome the shortcomings of existing couplers.

SUMMARY

In accordance with this disclosure, novel segmental duct coupler devices, systems, and methods are provided.

An exemplary duct coupler device for use in assembling concrete segments includes a single, discrete body of material. The body of material is annular and comprises a variable internal diameter and a variable outer diameter. The coupler device may connect to multiple different components via the different diameters. The body of material can comprise a weldable material that is configured to weld to a duct segment. The body of material is configured to couple to the duct segment without one or more internal seals, external seals, or any other sealing member disposed therebetween. The body of material is configured to abut the duct segment end-to-end without overlapping and/or extending around the duct segment. The exemplary duct coupler device can comprise plastic. The exemplary duct coupler device can comprise a diameter measuring approximately 58 millimeters (mm) or more.

An exemplary method of providing a duct coupler system is provided. The method includes providing a duct coupler device comprising a single, discrete body of material. The method further comprises providing a duct segment and welding the duct coupler device to a first end of the duct segment. The connection or points of connection between the duct coupler device and the duct segment are devoid of internal and/or external seals.

An exemplary duct coupler system is provided. The exemplary duct coupler system comprises a first duct segment comprising a first end and a second end that opposes the first end. The system further comprises a second duct segment comprising a first end and a second end that opposes the first end. The first end of each of the first and second duct segments comprises a first duct coupler device welded thereto. The second end of each of the first and second duct segments comprises a second duct coupler attached thereto. The first end of the first duct segment is configured to couple to the second end of the second duct segment. The exemplary system can be cast in concrete. A sealing member may be disposed between the first end of the first duct segment and the second end of the second duct segment. A bridge, roadway, building, or any other structure comprising a concrete slab may comprise the exemplary duct coupler devices and/or systems as set forth herein.

It is, therefore, an object of the present disclosure to provide devices and methods that provide less expensive and easier to assemble duct couplers and methods. These and other objects of the present disclosure as can become apparent from the disclosure herein are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures in which.

DETAILED DESCRIPTION

Figure 1A:
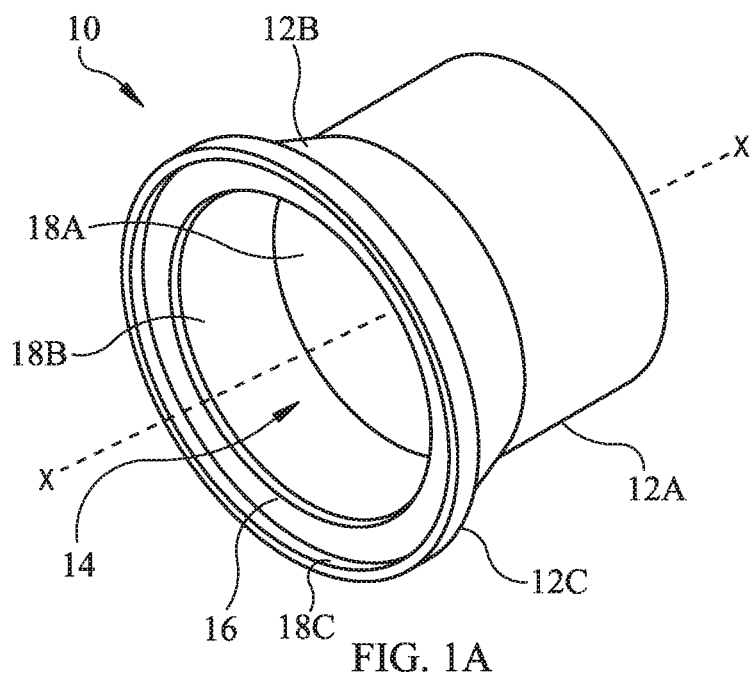
FIGS. 1A and 1B illustrate perspective and end views, respectively, of a duct coupler device according the subject matter herein.

Segmental duct coupler devices, systems, and methods are provided herein. The devices, systems, and methods set forth herein are technically beneficial and improved over previous solutions, as couplers (hubs) can more securely and efficiently attach to duct segments via welding. The welded coupler and duct segment assembly may be cast within a concrete segment after welding. Welding a coupler (e.g., also referred to as a "hub") to a duct segment as described herein decreases the cost(s) associated with providing segmental concrete blocks, coupling segmental concrete blocks, and/or providing structures or projects manufactured therefrom, while improving the ease of installation of a coupler to a respective duct segment.

Welding a coupler to a duct segment also obviates the need for frictionally connecting the coupler to a duct segment via one or more seals (e.g., gaskets, rings, elastomeric seals, or the like) that frictionally retain a coupler to a duct segment. Obviating the need for seals between the coupler and respective duct segment reduces the number of parts to manufacture and labor costs associated with installing the seals over duct segments. The coupler devices, systems, and methods herein provide more efficient, simpler, and less expensive welded assemblies, which in turn results in less expensive concrete structures that incorporate the coupler devices and systems described herein.

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein cover such modifications and variations.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Figures (also "FIGS.") 1A through 4 illustrate various views, aspects, and/or features associated with segmental duct coupler devices, systems, and related methods. Where possible, like reference numerals designate identical or corresponding elements in each of the several views.

Figure 1B:
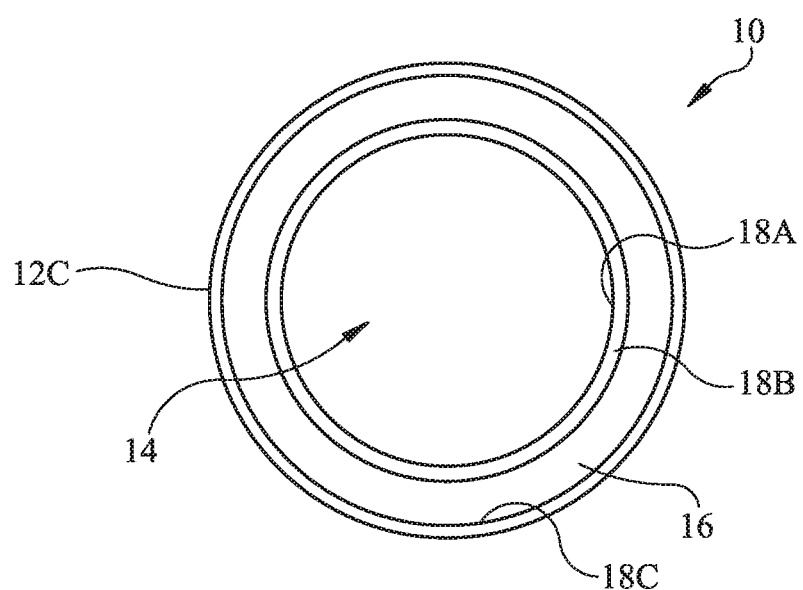

FIGS. 1A and 1B illustrate a duct coupling or coupler device, generally designated 10. Device 10 includes a single, discrete body of material or body 12. Body 12 may include an annular member comprising multiple portions, for example, a first body portion 12A, a second body portion 12B, and a third body portion 12C. First body portion 12A includes an inner diameter and an outer diameter that are substantially constant along a length thereof (e.g., along a longitudinal axis X). Second body portion 12B includes variable inner and outer diameters. In some embodiments, second body portion 12B includes inner and outer diameters that are each smaller proximate first body portion 12A and larger proximate third body portion 12C. Third body portion 12C comprises a shelf or ledge referred to as a face seal support flange 16 that is disposed about an opening, generally designated 14.

Body 12 may be manufactured or formed via any suitable process (e.g., molding, injection molding, extruding, or the like) and may include any suitable material. In an exemplary embodiment, body 12, either fully or portions thereof, includes any plastic (e.g., polypropylene) or polymeric material, and may exhibit some flexibility while maintaining overall rigidity. Body 12 can comprise a melt-able (or "meltable") material and thus a weld- able (or "weldable") material, such as plastic. Body 12 can comprise a substantially annular element or member having various integral and co-axial portions (e.g., 12A to 12C) that extend along a central axis in a longitudinal direction (e.g., length) thereof, such as a longitudinal axis X. Body 12 may include any size and/or shape, and may be white in color (or other color). In some embodiments, an outer surface of body 12 is devoid of ribs or surface features thereon, and is substantially smooth for improved weldability.

Still referring to FIGS. 1A and 1B, body 12, or co-axial portions thereof, include inner and outer surfaces that vary in diameter for allowing device 10 to facilitate coupling between one or more differently sized components and/or one or different types of components. For example, first body portion 12A includes a first inner surface 18A. First inner surface 18A is an annular surface having a constant diameter along a length thereof. In some embodiments, first body portion 12A is configured to attach to a first component (e.g., a duct segment S, FIG. 2) via welding. No seals or gaskets may be provided between first body portion 12A and the component to which it is attached; as such components can couple via welding. Thus, first body portion 12A may not be removable from the first component, where welded, and may be permanently affixed thereto.

Third body portion 12C opposes first body portion 12A and is configured to attach to a second component (e.g., a seal 22, FIG. 3A), which may differ from the component attached to first body portion 12A (e.g., 12C may attach to a component that is not a duct segment). For example, a sealing member may be seated within third body portion 12C, or a portion thereof. In some embodiments, a sealing member is retained by a third inner surface 18C of third body portion 12C. Thus, device 10 facilitates coupling between two different components, which may include different diameter components.

In some embodiments, second body portion 12B is disposed between first body portion 12A and third body portion 12C, and includes a second inner surface 18B. Second inner surface 18B is angled, tapered, and/or inclined between first body portion 12A and third body portion 12C. Second inner surface 18B changes or varies in diameter between first body portion 12A and third body portion 12C to facilitate coupling of the different components and/or differently sized components.

Third body portion 12C comprises a third surface 18C that is configured to attach to, compress, and/or retain a component. For example, third surface 18C may include a flange that is configured to receive and/or retain a sealing member such as a gasket or seal. Notably, first body portion 12A, second body portion 12B, and third body portion 12C are connected and in fluid communication via opening 14. In some embodiments, one or more rods, strands, bars, mechanical components, or the like extend through opening 14 and pass through respective first, second, and third body portions 12A to 12C. For example, device 10 may be assembled to at least one end of at least one duct segment (e.g., S, FIG. 2), and reinforcing elements (e.g., strands, bars, rods, or the like) and/or grout can be provided therethrough.

In some embodiments, device 10 is referred to as a coupler "hub" that is adapted to abut end-to-end with a duct segment (e.g., S, FIG. 2) and be welded thereto. Device 10 includes a hollow hub having opening 14. Body 12 may include varying internal and external diameters enabling connectivity to various differently sized duct segments and/or other components, where desired. However, at least a portion of device 10 has substantially a same internal and/or external diameter as a duct segment (e.g., within +/−1 mm of a diameter of a duct segment) to which it will be welded, so that device 10 abuts end-to-end with the duct segment, without any overlap. Overlap between the device 10 and a duct segment is unnecessary, as welding device 10 to a duct segment obviates the need for seals between the device and duct segment. Rather, welding facilitates closing and/or sealing the gap or joint between device 10 and the respective duct segment thereby eliminating the need for any additional (e.g., secondary) sealing or closing parts, such as gaskets or seals. Device 10 may couple to a duct segment (e.g., S, FIG. 2) via welding, thus obviating the need for internal seals, external seals, and/or any type of sealing member(s) disposed between the duct segment and device 10, thereby providing more effective and efficient coupling of segmental ducts at a reduced cost.

Still referring to FIGS. 1A and 1B, device 10 further includes a seat, ledge, or face seal support flange 16 disposed on one end. Face seal support flange 16 may include a planar surface or face, which is disposed along a plane that is substantially orthogonal to longitudinal axis X (FIG. 1A) of device 10. In some embodiments, face seal support flange 16 is configured to receive a sealing member (e.g., 22, FIG. 3) or recess former for forming the concrete during casting and/or for providing a waterproof, leak-proof seal between device 10 and adjacent components.

Figure 2:
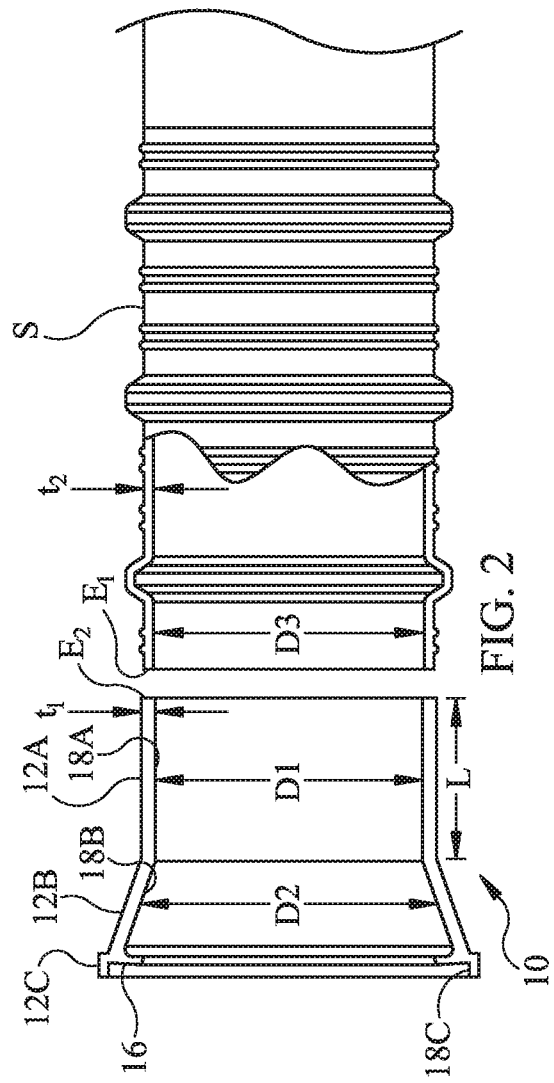
FIG. 2 illustrates side and sectional views of a duct coupler device according to the subject matter herein.

FIG. 2 is an exploded view of coupler device 10 and a duct segment S. Device 10 is configured to abut with duct segment S, end-to-end, and be welded thereto. Body 12 of device 10 includes a first diameter D1 and a second diameter D2. For example, a first end $E_1$ of duct segment S abuts an opposing end $E_2$ of device 10, and is welded thereto. Welding closes a gap or joint between opposing ends $E_1$ and $E_2$, without the need for any additional sealing components.

First body portion 12A of device 10 comprises a first diameter D1 extending along a length L thereof, and includes substantially a same inner and/or outer diameter as end $E_1$ of duct segment S (i.e., within +/−1 mm), such that upon welding, no portion of device 10 overlaps and/or extends over or around duct segment S. Table 1 below includes exemplary dimensions associated with device 10 and duct segment S, as illustrated in FIG. 2. All dimensions in Table 1 below are in millimeters (mm).

TABLE 1

| DUCT SEGMENT (S) | | DEVICE (10) | | |
|---|---|---|---|---|
| INNER DIAMETER (D3) | THICKNESS (t2) | LENGTH (L) | INNER DIAMETER (D1) | THICKNESS (t1) |
| 59 | 2.54 | 46 | 58 | 3.54 |
| 76 | 3.05 | 46 | 75 | 4.05 |
| 100 | 3.56 | 56 | 99 | 4.56 |
| 130 | 4.57 | 56 | 129 | 5.57 |

As noted in Table 1 above, first inner diameter D1 of device 10 is, in some aspects, approximately the same as, or within +/−1 mm of, an inner diameter D3 of duct segment S, so that the ends may abut end-to-end for improved welding. The thicknesses t1 ad t2 of respective device 10 and duct segment S are also substantially the same and/or similar, again, within +/−1 mm for improved welding and ease of manufacture. During welding, a length L of first body portion 12A of device 10, or any other portion thereof, may optionally be fixedly held within a clamp or other tooling (not shown) for more accurate and efficient welding, where desired.

As persons having skill in the art will appreciate, devices 10 and duct segments S described herein are in no way limited to the dimensions in Table 1 above, as the dimensions in Table 1 are purely exemplary. Devices 10 and duct segments S having larger, smaller, or intermediate dimensions compared to any of the dimensions set forth in Table 1 above are contemplated.

Still referring to FIG. 2, duct segment S can comprise a hollow plastic (e.g., polypropylene) or polymeric duct with a corrugated body. In some embodiments, at least one device 10 is welded to at least one end (e.g., $E_1$) of segment S. A same or different type of coupler device (hub) may be provided on an opposing end (e.g., FIG. 3) of duct segment S, or the end of segment S that is opposite from $E_1$. The coupler/duct segment structure or assembly may then be cast within a concrete block or segment (e.g., FIG. 3B). Face seal support flange 16 is configured to be at least partially and/or fully exposed along a planar face of a cast and set concrete block or segment, for facilitating coupling to adjacent concrete segments, for example, upon provision of a sealing member (e.g., 22, FIG. 3) between opposing face seal support flanges (e.g., 16) of opposing couplers and applying pressure to the concrete segments. In some aspects, outer and inner surfaces of duct segment S are devoid of sealing members provided or positioned thereon. Notably, when cast in concrete, the concrete directly contacts device 10, segment S, and the joint therebetween thus eliminating the need for additional seals between respective ends $E_1$ and $E_2$ of duct segment S and device 10.

After welding at least one device 10 to first end $E_1$ of segment S and casting the welded structure in concrete, one or more structural components such as one or more rods, strands, or bars (not shown) may then be inserted within and/or through the duct segments S. Grout (not shown) may also be applied or dispensed internally within portions of device 10 and segment S for retaining the structural components. A plurality of concrete segments (not shown) and respective duct segments S cast therein are configured to abut end-to-end so that the adjacent concrete segments and respective duct segments S may be coupled or joined together upon tensioning the rods, strands, or bars which extend through the network of adjacent duct segments S. An epoxy or glue may be applied to planar faces of opposing concrete blocks containing the respective ducts prior to tensioning the rods, strands, or bars, where desired.

Figure 3A:
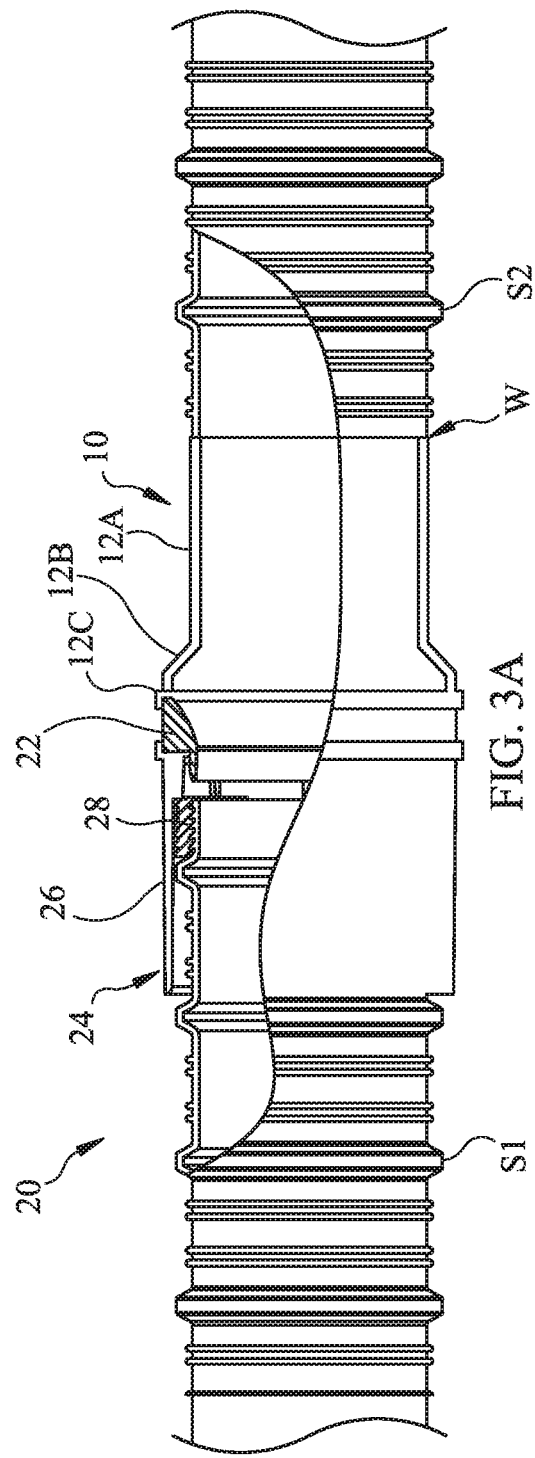
FIGS. 3A and 3B illustrates side and sectional views of a duct coupler system according to the subject matter herein.

FIG. 3A is an embodiment of a duct coupler system, generally designated 20. System 20 includes a first duct segment S1 and a second duct segment S2. At least one end of respective first and second duct segments S1 and S2 is provided with a coupler device 10 welded thereto. The other (e.g., opposing) end of each duct segment S1 and S2 may be provided with a coupler device which may or may not be welded and may or may not be structurally similar to coupler device 10. That is, respective first and second duct segments S1 and S2 may be provided with two opposing coupler devices (one on either end), one of which may include device 10, and the other may include a second coupler member or device generally designated 24, as shown in FIG.

3A. Second coupler device 24 may include a different type and/or size of coupler. In some embodiments, second device 24 includes a non-welded coupler that is configured to frictionally couple a duct hub 26 to duct segment S1 via an internal sealing member 28. For illustration purposes only, a single end of each duct segment (e.g., S1 and S2) is shown in FIG. 3A. It is assumed that the other end of first duct segment S1, which is not shown, includes a welded coupler device 10, and that the other end of second duct segment S2 includes either a welded coupler device 10 or a second (non-welded) coupler device 24.

In some embodiments, the non-welded coupler device 24 is movable (e.g., pivotably, flexibly, adjustably) with respect to the respective duct segment by virtue of the frictional connection and internal seal, whereas coupler device 10 is welded, and not movable with respect to the attached duct segment. In some embodiments, body 12 comprises a tapered hub, whereas duct hub 26 comprises an adjustable hub, as it may be positionaly adjustable with respect to a duct segment by virtue of the internal sealing member 28. The tapered hub (e.g., 12) is not adjustable once welded onto a duct segment.

A sealing member 22 may be provided and positioned between opposing couplers or coupling devices, for example, between a first (welded) coupler device 10 and a second (non-welded) coupler device 24 for sealing surfaces therebetween and/or portions of opposing concrete segments (FIG. 3B) and duct segments (e.g., S1 and S2) cast therein. Sealing member 22 is configured to seal surfaces between opposing couplers (e.g., 10, 24, or the like), which may include different types of couplers (e.g., welded or non-welded). Notably, device 10 is compatible with different types and/or sizes of couplers, and may be sealed against and/or coupled to differently configured couplers. Sealing member 22 does not need to contact the duct segments (e.g., S1 and S2), but rather becomes compressed and/or confined between opposing face seal support flange (e.g., 16, FIG. 1) of adjacent and opposing coupler devices (e.g., 10 and 24). In some embodiments, sealing member 22 includes a recess former, a forming member, and/or a deformable member which may be used to form a space in the concrete so that after the concrete solidifies, there is room for the coupler and additional sealing member 28.

Second coupler device 24 includes outer hub 26, which frictionally engages first duct segment S1 via internal sealing member 28. In contrast, no sealing member is required between device 10 and second duct segment S2. Rather, device 10 is welded to duct segment S2 along a weld seam or weld bead W. Thus, device 10 obviates the need for one or more additional internal sealing members, such as sealing member 28.

Figure 3B:
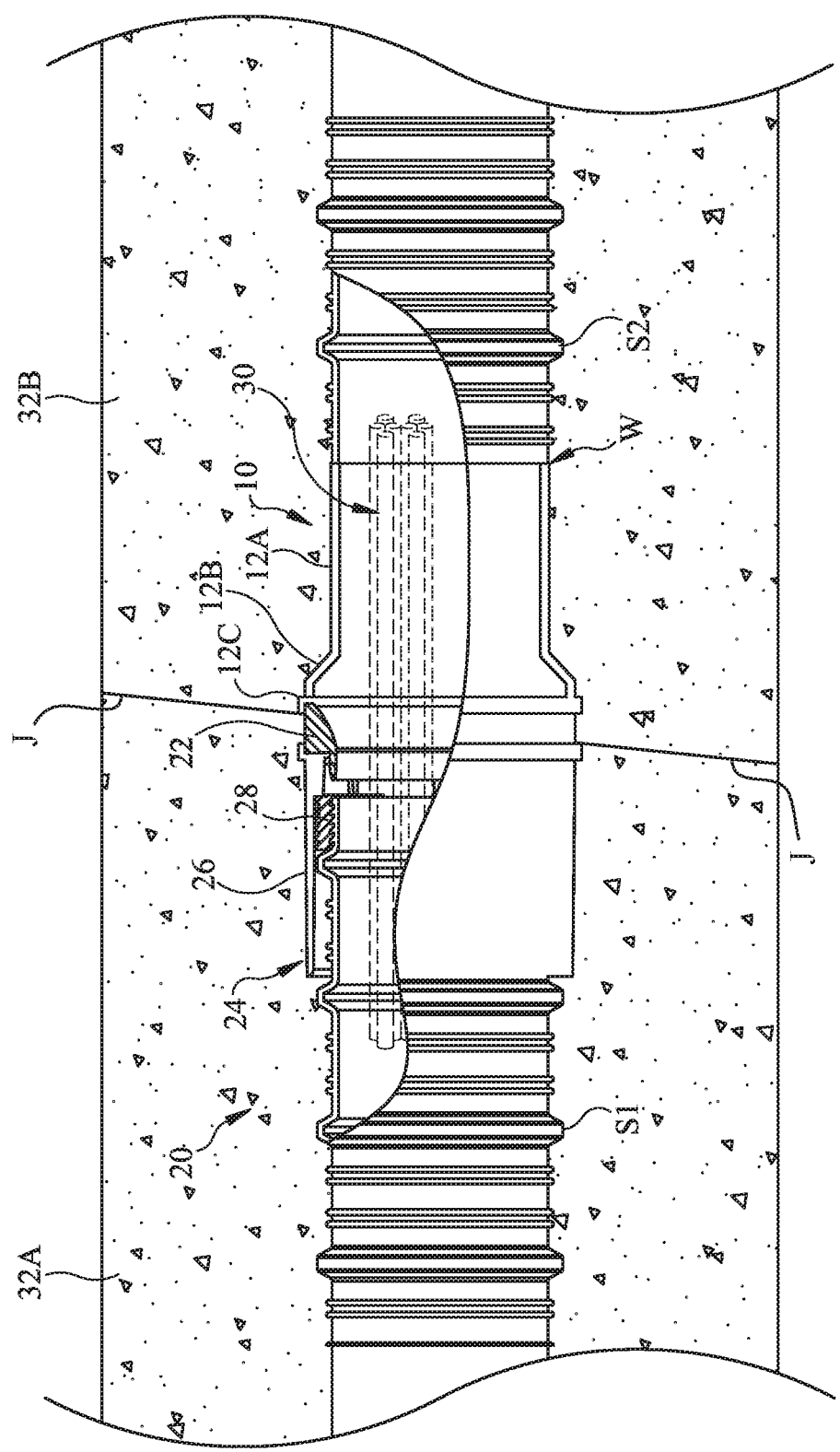

Referring now to FIG. 3B, system 20 is shown disposed within respective first and second concrete segments 32A and 32B. First and second concrete segments 32A and 32B are formed when concrete is cast (e.g., poured and set) around system 20. First segment 32A includes first duct segment S1 therein and second segment 32B includes second duct segment S2 therein. Each respective first and second duct segment S1 and S2 includes a coupler on at least one end that is either welded thereto (e.g., 10) or non-welded (e.g., 24, frictionally coupled). Respective first and second concrete segments 32A and 32B couple upon positioning the segments 32A and 32B end-to-end, providing a seal 22 between face seal support flanges (e.g., 16, FIG. 1) of opposing couplers (e.g., 10, 24) and compressing respective first and second concrete segments 32A and 32B to compress the seal 22 that is disposed between adjacent couplers.

In some embodiments, a planar face of respective first and second concrete segments 32A and 32B along a joint J may optionally be coated with epoxy, glue, adhesive, or the like prior to compressing seal 22. Once cast and set within concrete, one or more reinforcing members 30 may be inserted through duct segments S1, S2 and extend within and/or between duct segments S1 and S2 of system 20. Reinforcing members 30 may include one or more rods, bars, strands, or other type of strength bearing component. Concrete segments 32A and 32B may include angled surfaces at joint J, or surfaces that are substantially orthogonal to a longitudinal axis (e.g., X, FIG. 1) of the duct coupler devices, duct segments, and/or reinforcing members 30 disposed therein.

Although not shown for illustration purposes, persons of skill in the art will appreciate that multiple concrete segments and duct segments disposed therein may be assembled together and coupled via one or more systems (e.g., 20) to form one or more structures, including but not limited to one or more buildings, bridges, roadways, dams, walls, retaining structures, tunnels, components thereof, and/or any additional structure that may be contemplated. Such buildings and/or structures may be formed from a slab incorporating coupler devices and/or systems described herein.

It will be appreciated that FIGS. 2 through 3B are for illustrative purposes only and that various coupler devices, their locations, and/or their functionality described above in relation to each figure may be changed, altered, added, or removed.

Figure 4:
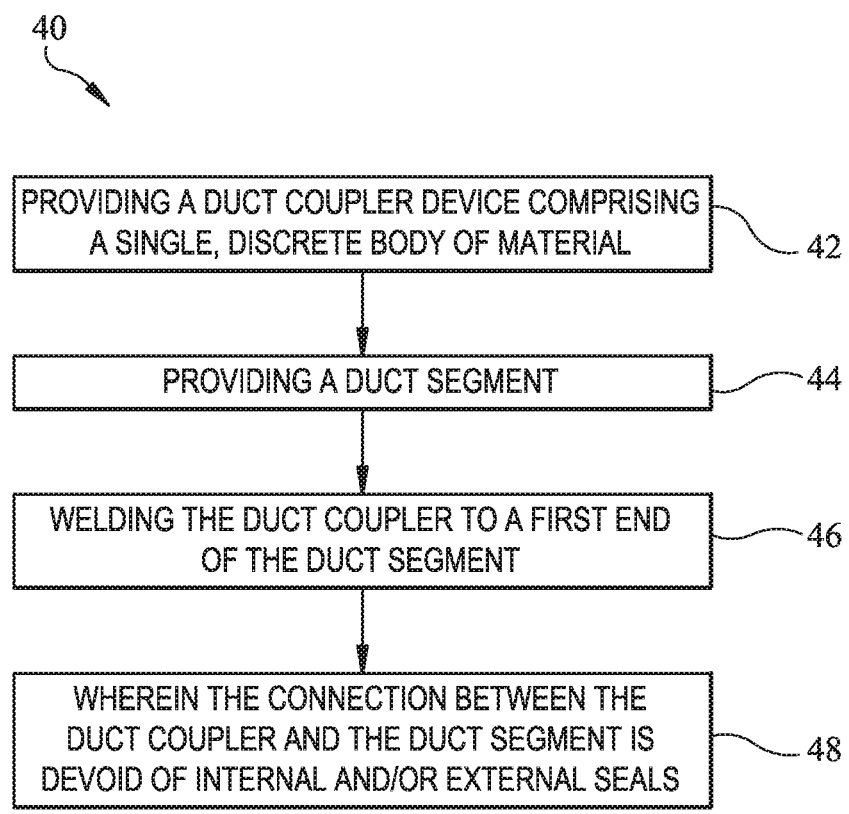
FIG. 4 is a flow diagram illustrating an exemplary method of providing a duct coupler system according to the subject matter herein.

FIG. 4 is a flow diagram illustrating an exemplary method, generally designated 40, of providing a duct coupler system according to the subject matter herein. In block 42, a duct coupler device is provided. The duct coupler device may be similar to device 10 described above, and include a single, discrete body of material (e.g., 12, FIG. 1).

In block 44, a duct segment (e.g., S, FIG. 2) may be provided. The duct segment and coupler device may be positioned such that they abut end-to-end without overlapping.

In block 46, the duct coupler device is welded to a first end of the duct segment.

In block 48, the connection between the duct coupler device and the duct segment is notably devoid of internal and/or external seals either thereon or therebetween. The system provided via method 40 may then be cast in a concrete segment or block, and coupled to another concrete segment block when a seal is provided between a face seal support flange (e.g., 16, FIG. 1) of the duct coupler device that is attached to the duct segment, and a shelf of another duct coupler device.

A further method of providing a duct coupling system and/or device herein may include a providing a duct coupler device and welding the duct coupler device to one end of a duct segment. The duct coupler device may include a discrete body provided (e.g., manufactured, injection molded, extruded, cast, pressed, machined, etc.) from a single body of material. The duct coupler device may include a variable inner and outer diameter, and in some embodiments include a tapered portion for tapering to a reduced diameter. The tapered portion of coupler device allows easier insertion of rods, bars, or strands through and/or within duct segments welded thereto.

In some embodiments, at least a portion of the inner and/or outer diameters is the same, or within +/−1 mm of the inner/outer diameters of the duct segment to which it is welded. This improves weldability, obviates the need for extensive tooling/assembly steps, and the reduced diameter/ extended length allows the coupler to be clamped during welding, for simplified welding. In some embodiments, coupler device is fusion welded to duct segment.

Another, similar coupler may be welded to the opposing end of the duct segment, or as shown in FIG. 3A, another differently configured coupler (e.g., 24) may be affixed to the opposing end of a duct segment. At least one end of each duct segment shall comprise a welded coupler device (e.g., 10).

Methods herein further include optionally casting the assembled coupler/duct segment structure or assembly in a single concrete structure, such that a portion of a coupler face seal support flange (e.g., 16, FIG. 1A) is exposed along a planar face of the concrete structure (e.g., a block or segment). Additional optional steps include providing a plurality of concrete blocks having a respective plurality of duct segments therein, where at least one coupler is welded to each of the plurality of duct segments. The plurality of duct segments can be joined to form a network of ducts. A sealing member (e.g., 22, FIG. 3) may be placed between portions (e.g., shelves) of opposing couplers and respective concrete blocks. Bars, rods, or strands may be inserted within the ducts and tensioned for joining the blocks together.

Aspects as disclosed herein can provide, for example and without limitation, one or more of the following beneficial technical effects or technical benefits: improved coupling of duct segments; improved coupling of concrete segments; reduced cost; improved efficiency; improved ease of manufacture and improved assembly of concrete segments including ducts and duct couplers herein.

While the subject matter has been has been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

We claim:

1. A duct coupler system, the system comprising:
 a first duct segment comprising a first end and a second end;
 a second duct segment comprising a first end and a second end;
 a non-metallic first duct coupler device welded to the first end of the first duct segment and comprising:
  a discrete annular body comprising:
   a first portion having a substantially constant diameter;
   a second portion extending from the first portion; and
   a third portion having a flange;
   wherein the second portion is angled, tapered, and/or inclined between the first portion and the third portion, such that an inner diameter of the second portion increases along a length of the second portion from the first portion to the third portion, such that a diameter of the third portion is greater than a diameter of the first portion; and
   wherein the flange extends radially inwardly from the third portion, in a form of a shelf or ledge, which has a planar surface or face that faces away, in a direction of a longitudinal axis of the duct coupler device, from the first and second portions and is perpendicular to the longitudinal axis for receiving a sealing member against the planar surface or face; and
 a second duct coupler device attached directly to the second end of the second duct segment, the second duct coupler device comprising a proximal end with a radial outermost lip portion with a planar flange that extends perpendicularly inward;
 wherein the first and second duct coupler devices are configured for coupling together to connect the first end of the first duct segment is configured to couple to the second end of the second duct segment; and
 wherein the flange of the second duct coupler device and the flange of the first duct coupler device receiving a sealing member therebetween.

2. The system of claim 1, wherein the second duct coupler is frictionally attached to the second duct segment via an internal sealing member.

3. The system of claim 1, wherein the system is cast in concrete.

4. The system of claim 1, wherein the sealing member comprises a recess former, a forming member, or a deformable member.

5. A bridge comprising the system of claim 1.

6. A roadway comprising the system of claim 1.

7. A slab comprising the system of claim 1.

8. The system of claim 1, wherein the annular body is configured to couple to the first duct segment without one or more internal seals, external seals, or any other sealing member disposed therebetween.

9. The system of claim 1, wherein the annular body is configured to abut the first duct segment end-to-end without overlapping and/or extending around the duct segment.

10. The system of claim 1, wherein the annular body comprises plastic.

11. The system of claim 1, wherein the first portion of the annular body comprises a diameter measuring approximately 58 millimeters (mm) or more.

12. The system of claim 11, wherein the diameter is approximately 75 mm.

13. The system of claim 11, wherein the diameter is approximately 99 mm.

14. The system of claim 11, wherein the diameter is approximately 129 mm.

15. A method of providing a duct coupler system, the method comprising:
 providing a first duct segment comprising a first end and a second end;
 providing a second duct segment comprising a first end and a second end;
 welding a non-metallic first duct coupler device to the first end of the first duct segment, wherein the first duct coupler device has a discrete annular body, the annular body comprising:
  a first portion having a substantially constant diameter;
  a second portion extending from the first portion; and
  a third portion having a flange;
  wherein the second portion is angled, tapered, and/or inclined between the first portion and the third portion, such that an inner diameter of the second portion increases along a length of the second portion from the first portion to the third portion, such that a diameter of the third portion is greater than a diameter of the first portion; and wherein the flange extends radially inwardly from the third portion, in a form of a shelf or ledge, which has a planar surface or face that faces away, in a direction of a longitudinal axis of the duct coupler device, from the first and second portions and is perpendicular to the longitudinal axis for receiving a sealing member against the planar surface or face;

attaching a second duct coupler device directly to the second end of the second duct segment, the second duct coupler device comprising a proximal end with a radial outermost lip portion with a planar flange that extends perpendicularly inward;

positioning a sealing member between the flange of the second duct coupler device and the flange of the first duct coupler device; and coupling the first and second duct coupler devices together to connect the first end of the first duct segment to the second end of the second duct segment.

16. The method of claim 15, wherein the duct coupler device and the duct segment abut end-to-end such that no portion of the duct coupler device overlaps the duct segment.

17. The method of claim 15, wherein the duct coupler device and the duct segment, or portions thereof, include approximately a same internal diameter, within +/− 1 millimeter (mm).

18. The method of claim 15, wherein the first duct coupler device and the first duct segment, or portions thereof, have respective external diameters that are within +/− 1 millimeter (mm) of each other.

19. The method of claim 15, wherein the first duct coupler device comprises a diameter measuring approximately 58 millimeters (mm) or more.

20. The method of claim 15, wherein the first duct coupler device and the first duct segment, or portions thereof, have respective thicknesses that are within +/− 1 millimeter (mm) of each other.

21. The method of claim 20, wherein the first duct coupler device comprises a thickness of approximately 3.54 mm or more.

22. The method of claim 15, comprising casting the first duct segment and the first duct coupler device in concrete.

23. The method of claim 22, comprising inserting metal rods, bars, and/or strands through portions of the first duct segment and the first duct coupler.

* * * * *